Figure 1:
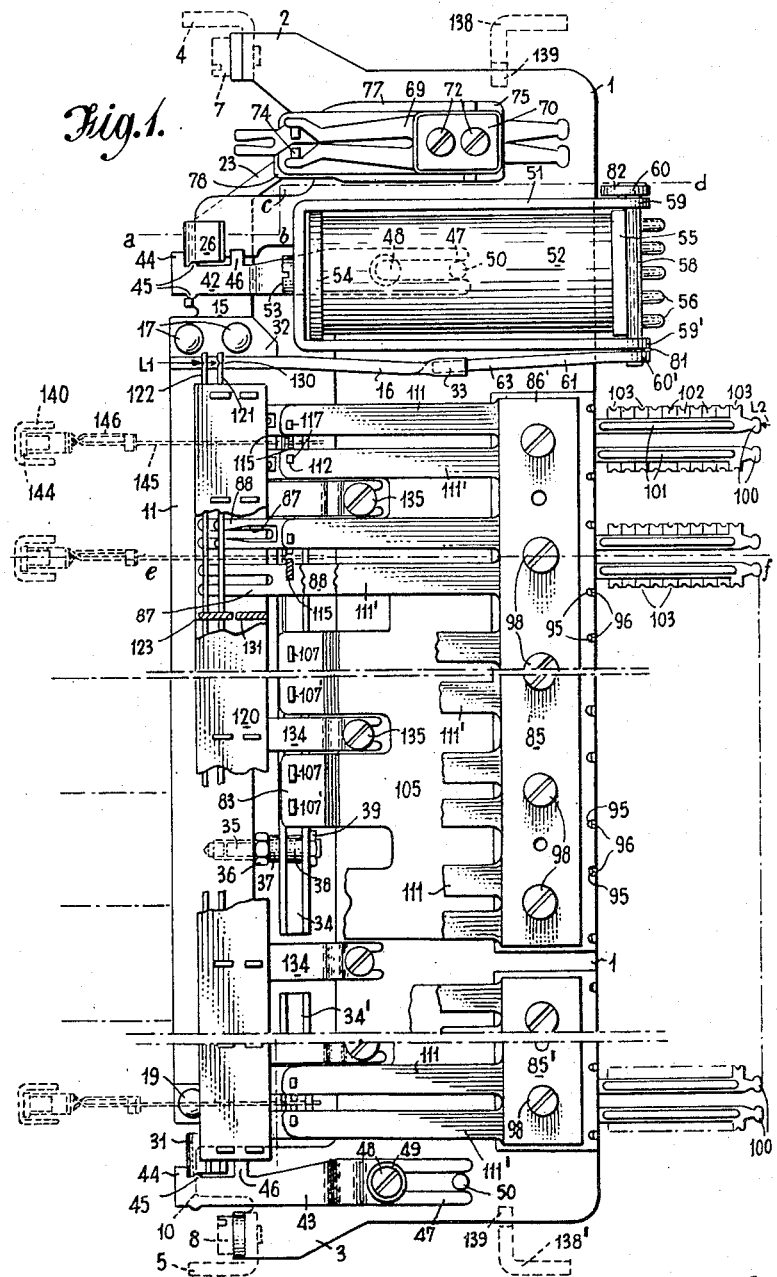

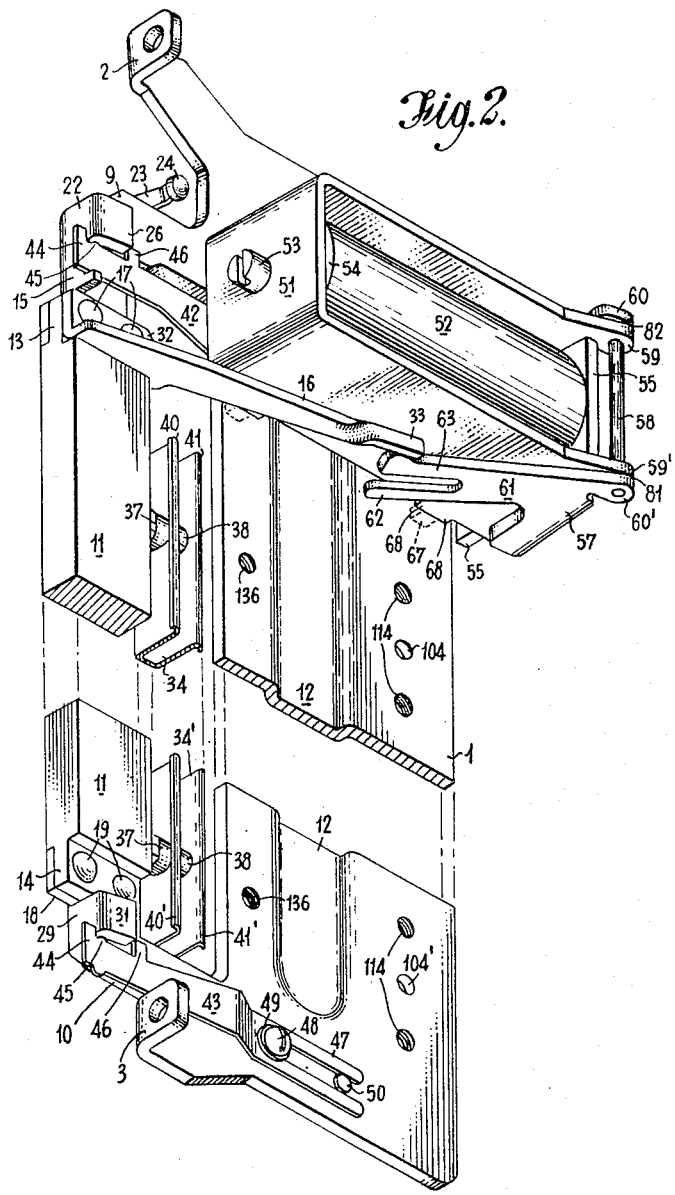

Oct. 12, 1954
A. J. MONTCHAUSSE ET AL
2,691,700
CROSSBAR MULTISELECTOR ARRANGEMENT
Filed May 16, 1952
10 Sheets-Sheet 3
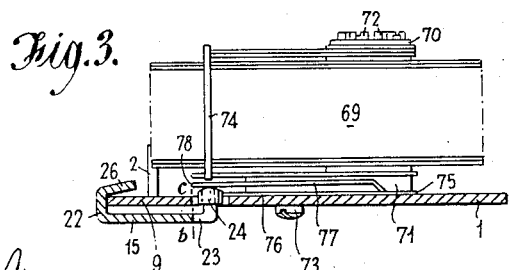
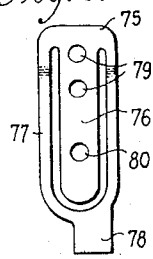
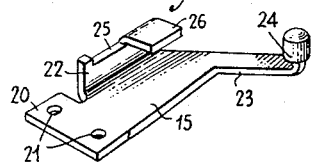
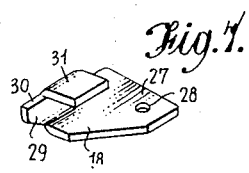
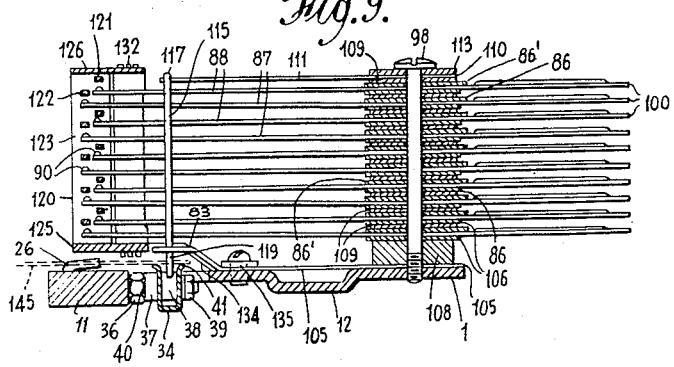
*Inventor*
A.J. MONTCHAUSSE'
D. DAUTRY
By *Robert Harding Jr.*
*Attorney*

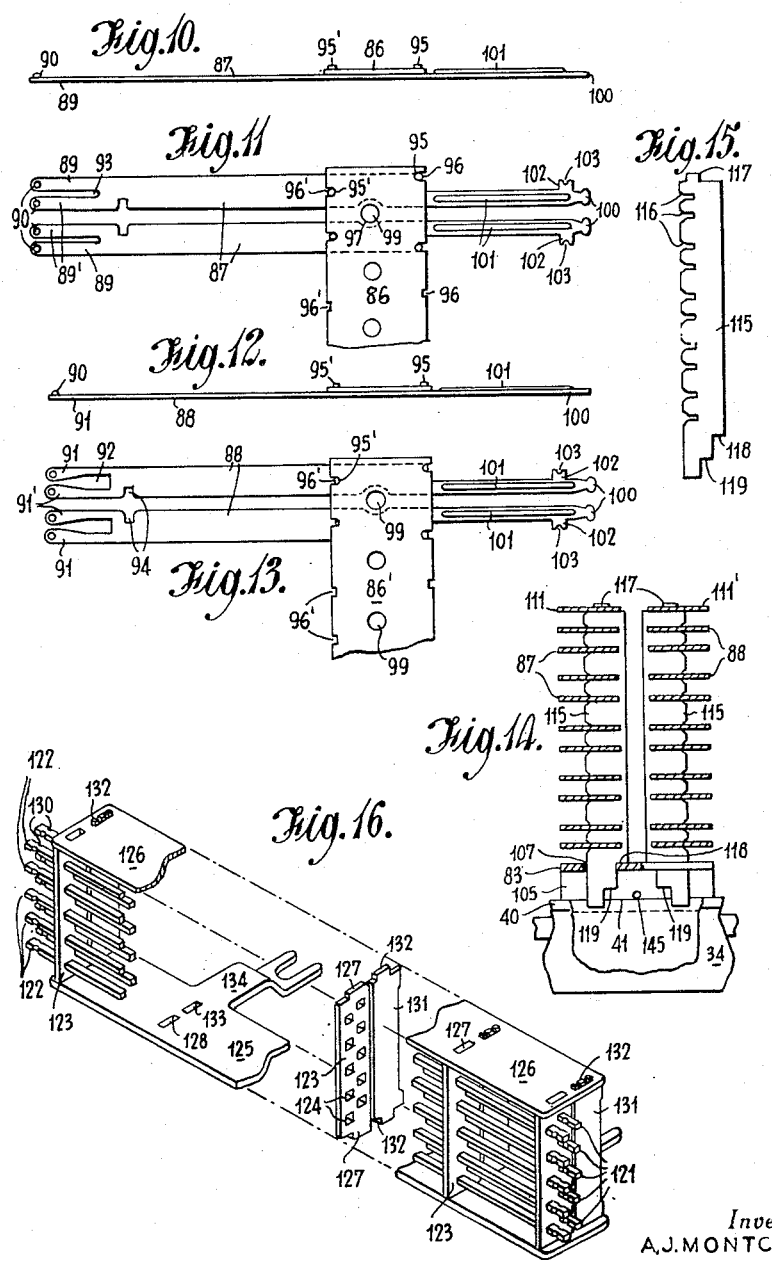

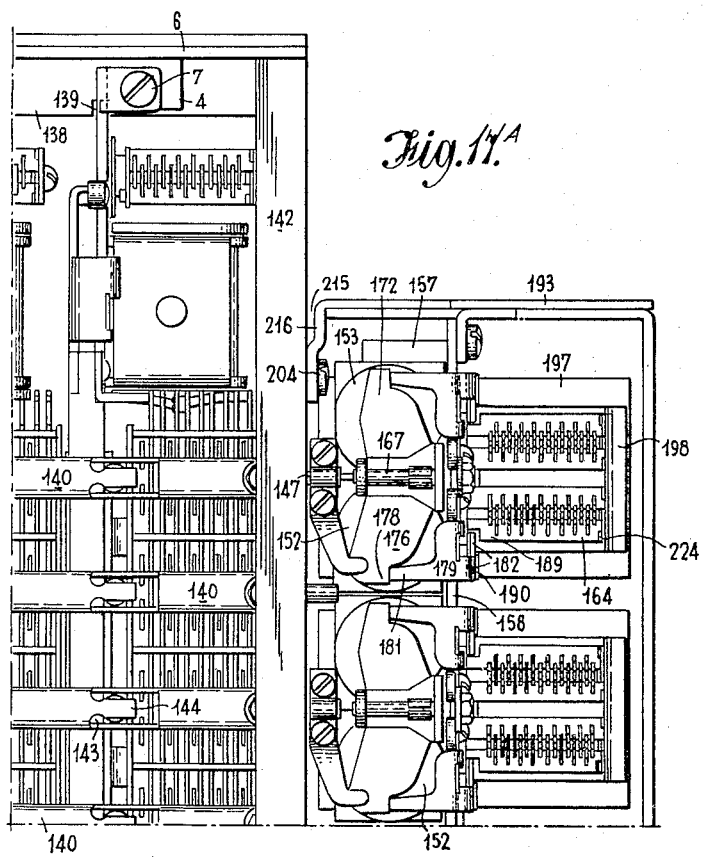

Oct. 12, 1954  A. J. MONTCHAUSSE ET AL  2,691,700
CROSSBAR MULTISELECTOR ARRANGEMENT
Filed May 16, 1952  10 Sheets-Sheet 7
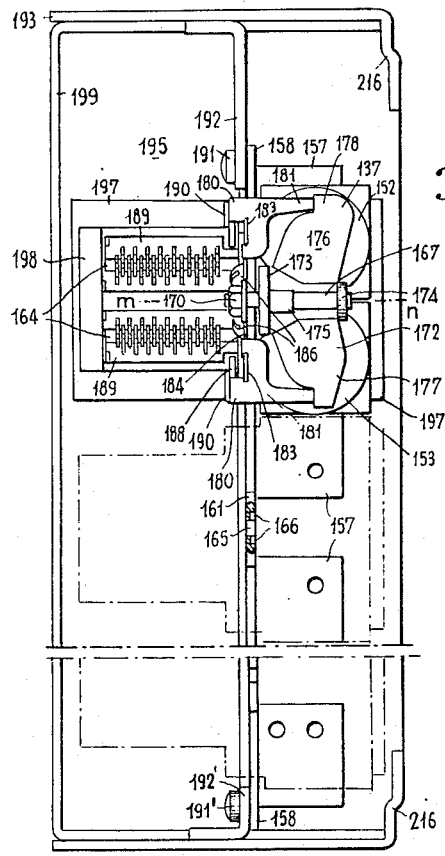
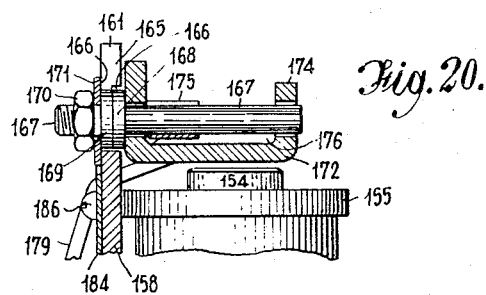
Inventor
A. J. MONTCHAUSSE
D. DAUTRY
By Robert Harding Jr.
Attorney

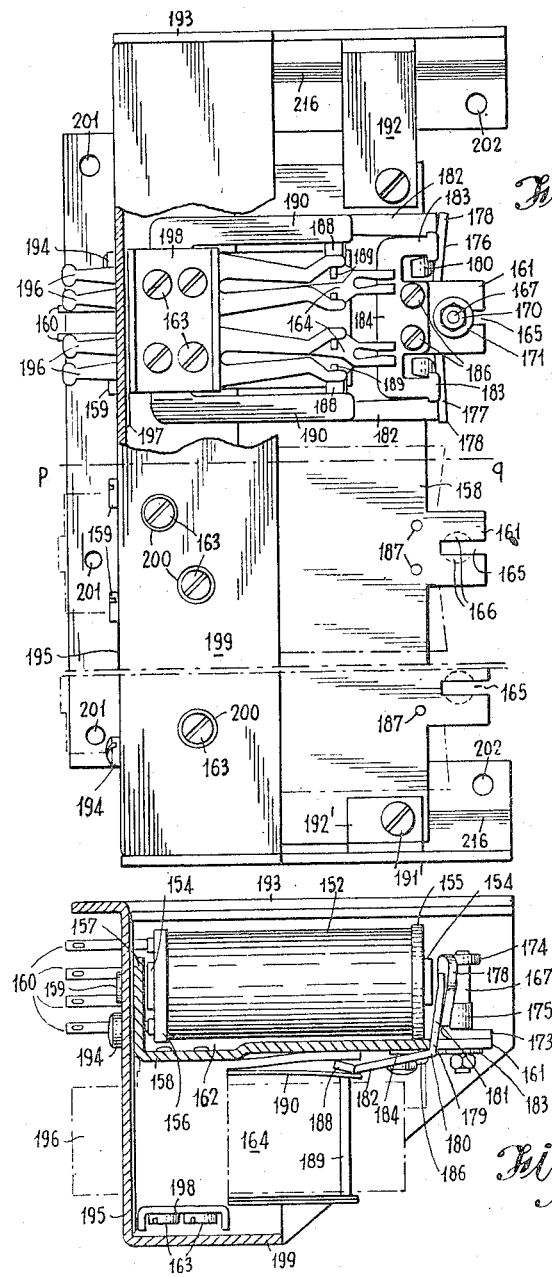

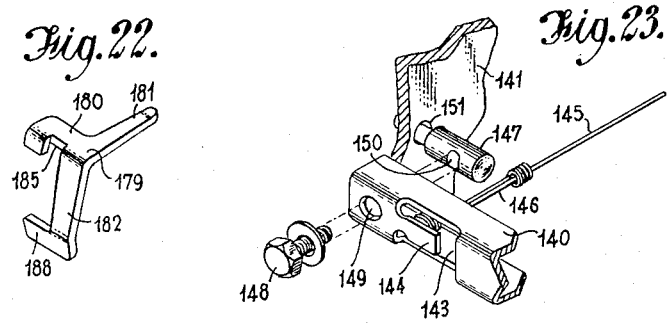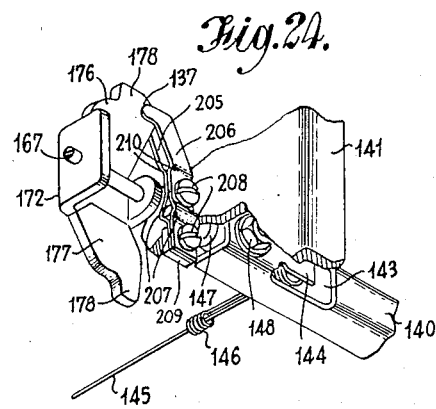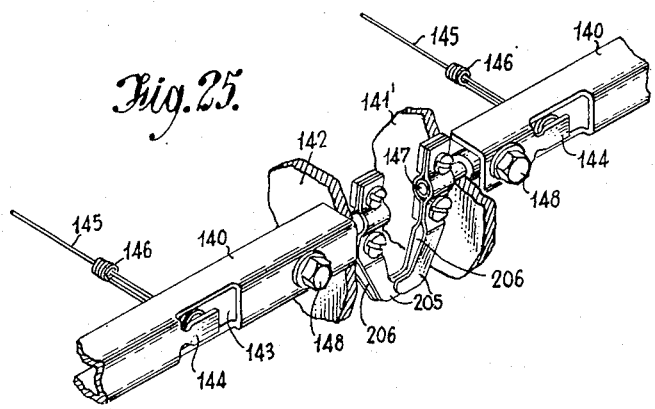

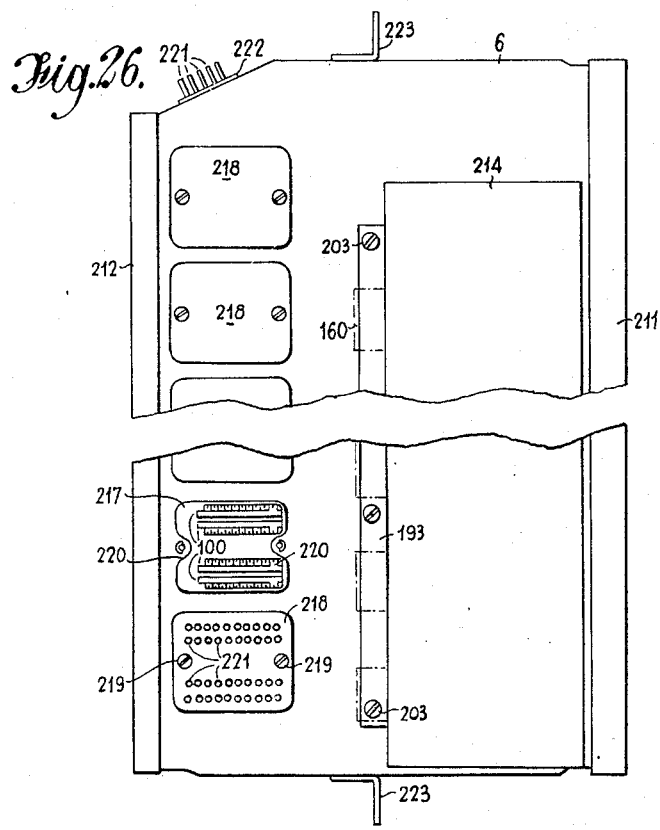

Patented Oct. 12, 1954

2,691,700

UNITED STATES PATENT OFFICE 2,691,700

CROSSBAR MULTISELECTOR ARRANGEMENT

André Jean Montchaussé, Paris, and Daniel Dautry, Clamart, France, assignors to International Standard Electric Corporation, New York, N. Y., a corporation of Delaware Application May 16, 1952, Serial No. 288,278

Claims priority, application France May 18, 1951

11 Claims. (Cl. 179—27.54)

This invention relates to a method of designing a multi-selector arrangement controlled by cross-bars, used in telephone systems or similar systems for making a given connection through the successive operation of two bars. It also has as its object a certain number of improvements in arrangements, of this type.

In these arrangements a selecting bar is first operated in preparation for connecting a selector to a given line, this connection being effected by the operation of the controlling bar of said selector. This controlling bar is operated by a controlling magnet, and it is of advantage to be able to use that part of the driving-force curve which, combined with a suitable proportionality factor, will be best adapted to the resisting-force curve.

One of the features of this invention is based on a transmission system between the magnet and the controlling bar that is made up of a first lever arm rigidly attached to the movable blade of said magnet and a second lever arm rigidly attached to the controlling bar, the second lever arm being dependent on the first arm in such a way that, when the magnet is energized, the lever arm attached to the blade operates the lever arm attached to the controlling arm, thus causing said bar to move, the ratio of the distances through which the bar and the armature move being given.

Another feature of the invention is based on the fact that the lever arm rigidly attached to the blade consists of two deformable elements, the first element being supported by a stop when the magnet is in the unoperated position, the second element acting on the lever arm rigidly attached to the controlling bar when the magnet is energized, so that, on the one hand, the stroke of the movable blade can be adjusted by acting on the first element and, on the other hand, the relative positions of the armature and the controlling bar can be adjusted by acting on the second element or on the lever arm rigidly attached to said bar.

Another feature of the invention consists in placing the magnet that operates the controlling bar on the same side as the contact spring stacks of the selector with respect to the supporting plate of said selector, so as to reduce the size of the multi-selector.

Each selector comprises fixed contacts made up of a certain number of bars and movable contacts attached to the end of movable springs, said movable springs being assembled in stacks. The stacks should be as small as possible.

Another feature of the invention consists in building up all or part of the movable-contact-spring stacks from springs of different lengths, the contacts of said springs each being placed opposite stationary contacts in such a way that each of the assemblies made up of a stationary and a movable contact is outside the space between the springs, the size of all or part of the stack being limited to the spacing required between said springs.

The stationary contact bars usually used are either made of or covered with a precious metal so as to improve the quality of the contacts, the high cost of these metals making it necessary to use them sparingly.

Another feature of the invention consists in making the stationary contacts of bars having a polygonal cross section covered with a precious metal or an alloy having a precious metal as a base only on the side opposite the movable contacts.

The selecting magnets that act on the selecting bars also operate certain front or back contacts in order to effect any suitable switching operations.

Another feature of the invention consists in placing the thick side of the contact spring stacks associated with the selecting magnets parallel to the selecting bars in such a way that the thickness is not limited by the spacing between said selecting bars and that each of said springs is arranged in a vertical plane.

Another feature of the invention is based on a transmission system between the movable blade of the selecting magnet and the movable contact springs, this system consisting of a two-arm lever that can rotate around an axis perpendicular to that of the blade, one of the arms being made dependent on the blade and the other arm acting on the movable contact springs in such a way that the blade and the movable springs move in two substantially perpendicular directions.

In order to make a multi-selector comprising a large number of selectors, two or more multi-selectors may be associated with one another in such a way as to couple their selecting bars mechanically, the same selecting magnets being used for all the multi-selectors. In connecting the selecting bars, every precaution should be taken to compensate for any misalignment of the axes of said selecting bars.

Another feature of the invention is based on a coupling device between the moving shafts, this device consisting of two driving arms each rigidly attached to one of the two shafts and whose free ends are made dependent on each other in such a way that, for a slight angular motion, the point of contact between said ends moves along a curve substantially coinciding with the circles described by these ends.

Another feature of the invention is based on the use of a device that drives a selecting bar through the movable blade of a magnet, this device consisting of a driving arm rigidly attached to the selecting-bar shaft and whose free end is made dependent on the movable blade of the magnet.

Another feature of the invention consists in making the driving arm of two flat parts rigidly attached to the shaft and bent in such a way that their free ends squeeze the driving part or the movable blade on which said arm is made dependent.

Figure 17:
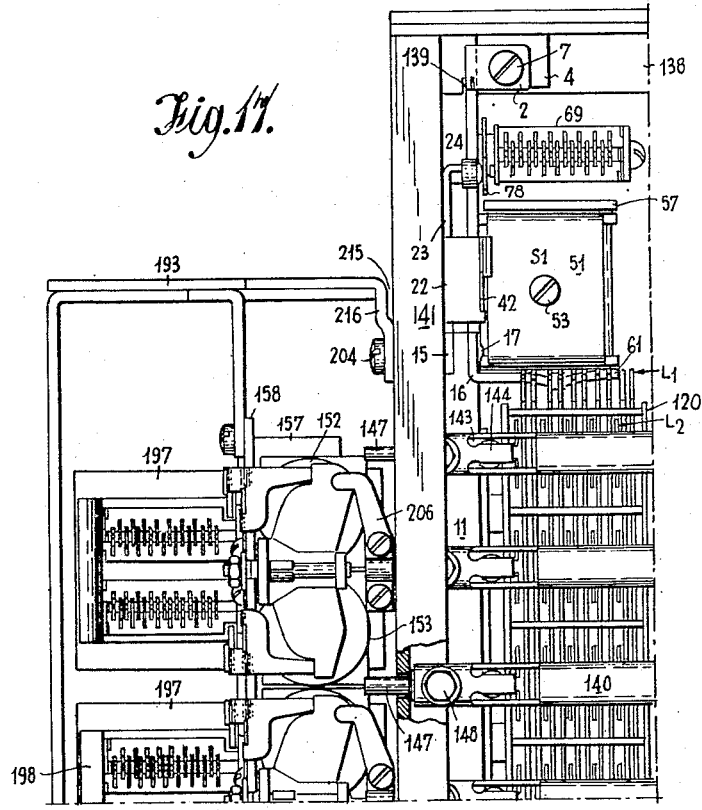

Various other features will become apparent from the following description of a multi-selector, given by way of a non-limitative example with reference to the figures, which represent:

Fig. 1, a side view of a multi-selector certain parts of which have been cut away;

Fig. 2, a perspective view of the supporting plate of a selector on which are mounted the magnet for driving the controlling bar as well as the controlling bar itself;

Fig. 3, a sectional view along a—b—c—d of Fig. 1;

Fig. 4, a plan view of the intermediate part that drives the movable contact spring of the controlling-bar magnet;

Fig. 5, a profile view of the part shown in Fig. 4;

Figs. 6 and 7, two perspective views of the parts for connecting the controlling bar;

Fig. 8, a perspective view of the movable blade of the magnet that drives the controlling bar;

Fig. 9, a sectional view along e—f of Fig. 1;

Figs. 10, 11, 12, 13, views each showing in profile and in plan the arrangement of the movable contact springs forming the stacks of a selector, on their insulator supports;

Fig. 14, a sectional view along g—h of Fig. 1;

Fig. 15, a guide bar of the selector's movable contact springs;

Fig. 16, a partial perspective view of a multi-selector;

Figs. 17 and 17a, a partial side view of a multi-selector;

Figs. 18 and 19, two views, one front and one side view, of a selecting magnet box;

Fig. 20, a sectional view along m—n of Fig. 18;

Fig. 21, a sectional view along p—q of Fig. 19;

Fig. 22, a perspective view of a lever for actuating the movable contact springs of a stack associated with the selecting magnet;

Fig. 23, a perspective view showing the mounting of the end of a selecting bar;

Fig. 24, a perspective view showing the device for driving a selecting bar through the movable blade of a group of selecting magnets;

Fig. 25, a perspective view showing the device for connecting two selecting bars;

Fig. 26, a partial side view of a multi-selector with its covers;

Figs. 27, 28, 29 and 30, sectional views of four embodiment variants of the controlling bar of a selector.

With reference to Figs. 1 to 16, one of the selectors that go to make up the multi-selector of the invention will first be described.

A selector consists of a metal supporting plate 1 cut in such a way as to have two members, one upper member 2 and one lower member 3, the ends of which are bent at right angles, these members being used to attach the selector by means of two screws 7 and 8 to angle irons 4 and 5, attached to the sides of a box 6, and two other members 9 and 10 which support, and to which is rotatably attached, controlling bar 11. A central web 12 (Fig. 2) is provided in order to increase the rigidity of supporting plate 1.

Controlling bar 11 consists of a metal bar of rectangular cross section. The two ends 13 and 14 are cut out on both sides, as shown in Fig. 2. An articulated member 15 and a driving lever 16 are attached on either side of end 13 by two rivets 17, or by any other suitable means. The other end 14 of bar 11 also carries an articulated member 18, attached by means of two rivets 19, or by any other suitable means.

The two articulated members 15 and 18 are cut out and bent as shown in Figs. 6 and 7, respectively. Member 15 consists of: a part 20, having two openings 21 for attaching rivets 17, a bent part 22 and a lever 23, at the tip of the bent end of which is inserted a knob 24 made of insulating material. Bent part 22 has a notch 25 and a folded portion 26, which form with bent member 22 an angle that is slightly greater than 90°, the plane of the notch 25 coinciding with the inside surface plane of part 26.

Member 18 (Fig. 7) incorporates a part 27 having two openings 28 to receive the attaching rivets 19 and a bent member 29. This member 29 is similar to member 22 of part 15 and has a notch 30 and a folded part 31, the plane of notch 30 coinciding with the inside surface plane of 31.

Lever 16 (Fig. 2), the free end 33 of which is rounded, is fastened with rivets 17 at its bent part 32 to the end 13 of bar 11.

Attached to the controlling bar 11 on the side opposite the supporting plate 1 are located two U-shaped driving members 34 and 34' (Fig. 2), the two branches of which, such as 40 and 41, are bent outward. Members 34 and 34' are assembled on threaded studs 35 (Fig. 1) which extend out at intervals along bar 11 and are held in place on the studs by nuts 39. Threaded studs 35 are locked by their hexagonal flange 36; a certain space is provided between the side of bar 11 and members 34 and 34' respectively, by part 37 of the studs, while spacers 38 prevent the two branches 40 and 41 from coming together when nut 39 is tightened.

Controlling bar 11 rests on the ends of members 9 and 10 of the supporting plate 1 through bent members 22 and 26 respectively, of part 15, as shown in Fig. 3, and bent members 29 and 31 respectively of part 18. It is held in this position by two springs 42 and 43 (Figs. 1 and 2).

Springs 42 and 43 have the same shape, as shown in Figs. 1 and 2. In order to secure bar 11 to members 9 and 10 of the supporting plate 1, springs 42 and 43 are provided with a retaining dowel 44 and they are bent so as to apply a suitable pressure on the notches 25 and 30 of the corresponding members 15 and 18 respectively, of bar 11. Two round nipples 45, placed substantially on the axis of rotation of the controlling bar, minimize the friction between springs 42 and 43 and the corresponding members 15 and 18 of bar 11. A second dowel 46 makes it possible to keep spring 42 level with supporting plate 1 when the controlling bar 11 is not in place. In this case, spring 43 rests against member 10. Springs 42 and 43 are attached at their forked ends 47 to supporting plate 1 by means of screws 48 and washers 49 and they are guided by bosses 50 obtained by punching plate 1 from its opposite face. Spring 43 is attached to supporting plate 1, while spring 42 is attached under said plate in order to provide space for the controlling-bar magnet; for this reason, springs 42 and 43 have different curvatures.

The magnet for driving the controlling bar 11 consists of a U-shaped yoke 51 between whose arms is located energizing coil 52, which is attached by a screw 53 which passes through the base of the U and works into the core of the coil.

Cheek 54 of the yoke side of the coil is round, while the cheek 55 on the armature side is rectangular and has connecting lugs 56, riveted in place. The windings of coil 52 are connected to these lugs.

The movable armature of the magnet (Figs. 2 and 8) consists of a blade 57 mounted on a pin 58 that passes through two projections 59 and 59' in the ends of the arms of yoke 51. Longitudinal displacement of pin 58 is prevented by an elastic locking arrangement 81 placed between projections 59' and 60' in a groove provided in said pin 58. A spacer 82 is provided between the two projections 59 and 60. Both sides of blade 57 are bent and cover the ends of the arms of yoke 51 (Fig. 2) in order to provide a path for the magnetic flux. One of these sides of the blade is extended by a lever arm 61, whose end has the shape of a two-toothed fork 62 and 63. Tooth 62 rests on supporting plate 1 when the magnet is not energized. By deforming or bending the tooth 62 so as to alter the space between teeth 62 and 63, we can obtain adjustment of the stroke of movable blade 58. End 33 of lever 16 rests on tooth 63 of blade 61. By similarly deforming tooth 63, the amplitude of the angular displacement of controlling bar 11 and the instantaneous relative positions of the magnet's armature and the controlling bar are adjusted.

In order to prevent the movable armature from being held in the operated position by the residual flux of the magnet's magnetic circuit when the magnet is de-energized, a thin plate 64, made of non-magnetic material, is attached to the inside face of plate 57 opposite the core of coil 52. For this purpose, plate 64 is provided with two extensions 65 bent back into two notches 66 provided in blade 57, as shown in Fig. 8.

The magnet is attached to supporting plate 1 of the selector by three lugs, such as 67 (Fig. 2), provided on yoke 51. Lugs 67 pass through plate 1 and are riveted on the opposite face, the magnet being supported on supporting plate 1 by shoulders, such as 68 and 68', provided on either side of each lug 67. This three-point attachment prevents deformation of yoke 51, and hence any deformation of the other parts of the magnet. Moreover, it will be noted that since yoke 51 is in contact with supporting plate 1 only through lugs 67 and their shoulders 68 and 68', supporting plate 1, which may be made of a ferrous metal not having magnetic properties, has but a negligible effect on the magnetic circuit.

On the armature side the magnet extends over supporting plate 1 in such a way as to isolate from plate 1 the connecting lugs 56 attached to cheek 55 of coil 52.

A stack 69 of stationary and movable contact springs attached to the top of supporting plate 1 (Figs. 1 and 3) is associated with the magnet. This stack 69 is made similar to that of the relays described in the copending patent application filed on December 13, 1951 by Daniel Dautry, and bearing Serial Number 261,538.

The contact springs of stack 69 are pressed between an upper plate 70 (Fig. 3) and a lower plate 71 by two screws 72. Stack 69 is attached to supporting plate 1 of the selector by a screw 73 passing through said plate 1 and working into plate 71.

The guide bar 74, on which are mounted the movable contact springs of stack 69, is under the control of lever 23 of member 15, rigidly attached to controlling bar 11 the lever 23 abutting against end 78 of spring 75.

Spring 75, shown in Figs. 4 and 5, comprises a central portion 76 by means of which said spring 75 is held tightly between supporting plate 1 of the selector and plate 71 of stack 69. Openings 79 are provided for the ends of screws 72, which enter two openings in supporting plate 1, one of which serves to guide stack 69 and spring 75. Opening 80 is provided for attaching screw 73.

The cut-out portion 77 of spring 75 is bent as shown and incorporates a member 78. One face of this member rests on the knob of lever 23, while the other face is opposite the end of movable guide bar 74. Since it is resilient, member 77 helps to return controlling bar 11 and, through lever 16, the movable armature, to the unoperated position when the magnet is de-energized.

Two stacks 85 and 85' of movable contact springs are mounted on supporting plate 1 of the selector (Fig. 1).

Each of stacks 85 and 85' is made up of a certain number of strips of insulating material, such as 86 and 86' (Figs. 10 to 13), to which are attached movable contact springs such as 87 and 88.

Springs 87, which are longer than springs 88, have bifurcated ends 89, 89' as shown in Fig. 11. The two small springs 89 and 89' thus obtained each carry a contact 90, which is welded electrically to it or attached to it in any suitable manner.

The ends of springs 88 (Fig. 13) are bifurcated to form two small springs 91 and 91' each carrying a contact 90, welded electrically to it. Recess 92 on springs 88 is made wider than recess 93 of springs 87 in order to make the ends as flexible as the moving ends of springs 87 and 88.

Each contact spring 87 or 88 also incorporates:

1. A slot 94 with rounded edges the purpose of which will be explained later;

2. Two extensions 95 and 95' cut in the spring and which serve to attach the springs to the insulating strips 86. For this purpose, strips 86 are provided with slots 96 and 96', in which extensions 95 and 95' are inserted and bent back over strips 86;

3. A recess 97 for clearing the attaching screws 98 (Figs. 1 and 9) which extend through holes 99 so as to prevent any contact between the springs and said screws 98;

4. A narrow terminal 100 provided with: a reinforcing longitudinal web 101; a connecting lug 102 extending transverse of the side edge of the spring, said lug having a slot 103 cut out, depending on the various arrangements, the lugs being located a different distance from the ends of terminals 100 so that the lugs 102 in the same stack will be clear of each other, and in a staggered array as shown in Fig. 1.

To an insulating strip 86 are attached springs of the same length, 87 or 88, the lugs 102 of which occupy the same relative position to terminals 100. The contact springs are arranged along strip 86 in groups of two so that the slots 94 of the two springs of each group are placed opposite each other; recesses 97 are also placed opposite each other on both sides of a hole 99 and the tabs 102 of terminals 100 are bent in opposite directions, i. e., one up, the other down.

The parts making up the two stacks 85 and 85' are assembled directly on supporting plate 1 of the selector. These stacks could also be designed so as to form removable assemblies.

With reference to Figs. 1, 2 and 9, an explanation will now be given of the manner of assembling one of the stacks 85 or 85'. Two guide rods, not shown, used to line up the parts of the stack, are first inserted through supporting plate 1 of the selector (Fig. 2) through openings, such as 104, 104', provided for that purpose.

A rigid metal plate 105 is placed on supporting plate 1. This plate 105 has an edge bent in an offset and is cut in the shape shown in cross-section in Fig. 9 and shown in plan view in the center of Fig. 1 so as to have a certain number of members 83 the end of which is raised so as to clear part 34 of operating bar 11. Each member 83 incorporates two rectangular openings 107 and 107'. The uncut portion of plate 105 is pre-bent so as to ensure the stability of said plate when it is resting on supporting plate 1 of the selector.

On plate 105 is mounted an insulated bar 108 (Fig. 9) the thickness of which is such as to bring the lower springs of the stack to a suitable level so as to clear members 83 of plate 105.

The following members are stacked up on each other on bar 108 (Fig. 9):

1. A strip 106 made of insulating material and having a length and width substantially equal to those of bar 108;
2. A strip 86 (Fig. 11) to which are attached the contact springs 87, the connecting tabs 102 of which are closest to strip 86;
3. A metal strip 109 having a certain width and whose length is the same as that of strip 108. The purpose of strip 109 is to give the stack a certain rigidity and at the same time to provide the desired spacing between the contact springs. Clearance slots, not shown, are provided on the lower side of this strip 109 in order to prevent electrical contact between attaching tabs 95' of springs 87 and said strip 109. The outside of strip 109 does not have any notches, since the strip 86 on which the contact springs are mounted projects sufficiently far over said strip;
4. An insulating strip 106 as described in 1;
5. A strip 86' (Fig. 13) to which are attached contact springs 88 the connecting tabs 102 of which occupy the next position with respect to tabs 102 of strip 86 in 2;
6. A metal strip 109 as described in above-numbered paragraph 3.

The stack sequence is made up of four assemblies comprising the members listed in 1 to 6, taken in the same order but for which the connecting tabs 102 are successively staggered one row toward the end of terminals 100. It will be noted that the connecting tabs 102 could be stacked up in the other direction.

Above the upper-most metal strip 109 is placed a plate 110 of spring metal, cut in the bifurcated shape shown in Fig. 1 so as to form spaced pairs of springs 111 and 111' which are lined up over the contact springs. A rectangular opening 112 is provided in the end of each spring 111. Springs 111 and 111' are pre-bent so as to exert pressure on the contact springs in the direction toward supporting plate 1.

The stack is terminated by a metal clamping strip 113 and is secured by screws 98 which pass through holes in the various members of the stack and extend into tapped holes 114 in supporting plate 1.

The second stack 85' is built up in the same manner as stack 85.

The movable contact springs superimposed on the spring stacks built up in this manner are held in definite positions with respect to each other and to elements 83 of plate 105 by guide bars 115.

These guide bars 115 (Fig. 15) are made of insulating material and incorporate a certain number of identical notches 116 the edges of which are slightly chamfered so as to facilitate installation of the contact springs. A lug 117 is provided in the upper portion of each guide bar 115, while the lower part of the bar has shoulders 118 and 119. The notches are uniformly spaced in groups of two.

The guide bars are assembled to the contact springs 87 and 88 of each spring stack by engaging notches 94 of said springs in notches 116 of said bars. The width of the notches 116 is such that the contact springs fit freely in them without appreciable play.

The lower portion of guide bars 115 is engaged in openings 107 (Fig. 1) of bent members 83 of plate 105, while the upper lug 117 is placed in the openings 112 of springs 111 of plate 110. Because of their curvature, springs 111 exert a pressure on the two shoulders of lugs 117 of guide bars 115, the shoulders of said guide bars resting against members 83 of plate 105 (Fig. 14).

As shown in Fig. 9, each of the contact springs 87 or 88 assembled with guide bars 115 is under a stationary contact bar of a bank 120.

Bank 120 (Fig. 16) is made up of two rows 121 and 122 of bars uniformly spaced in each row, the bars of the inside row 121 being raised with respect to the bars in the outer row 122. The bars are of rectangular cross section and their lower surface is covered with a thin layer of a precious metal. They are held in position by guide strips 123. Bars 121 and 122 pass through openings in said guide strips and are locked in position by clamps, such as 129, provided at each end of the bars. On one side of the bank is located a second clamp 130 at the end of the bars, these clamps being used to connect up the electric circuits.

Guide strips 123 are made up of plates of insulating material having rectangular openings 124 and having at both ends lugs 127. Guide strips 123 are arranged perpendicularly between two metal plates 125 and 126 provided with uniformly spaced rectangular openings 128 which receive lugs 127 of guide strips 123. Plates 125 and 126 are assembled and kept spaced by metal spacers 131 each having at its end a lug 132. Spacers 131 are installed alongside guide strips 123; lugs 132 pass through openings 133 in plates 125 and 126 and are attached to said plates.

The lower plate 125 is provided with a certain number of attaching lugs 134, which are bent to form an offset mounting lug which will act to keep clear bank 120 of controlling bar 11 and which have a forked end 134a.

Bank 120 is installed on the selector, the ends of the contact springs 87, 88 being arranged under the respective bars (Fig. 9). The attaching lugs 134 are inserted between the groups of contact-spring sets and are attached by screws 135 working into tapped holes 136 provided in supporting plate 1 of the selector.

If it is desired to remove controlling bar 11 from the selector, it will suffice to raise springs 42 and 43 and to slide bar 11 axially and downward so as to disengage lever 16 from its support on tooth 63 of armature 61. The bar is then rotated so as to disengage driving member 34 from the ends of guide bar 115. It is then possible to pull out the bar from the front of the device.

The selectors, prepared in the manner just described, are placed alongside each other in a box 6 and have their upper and lower members 2 and 3, respectively, attached by screws 7 and 8 to squares 4 and 5 secured to the top and bottom of box 6 (Fig. 17). They are also guided by two squares, upper square 138 and lower square 138' (Figs. 1 and 17), attached to the inside of box 6 and provided with slots 139 into which are inserted the selector supporting plates 1.

A certain number of selecting bars 140 are mounted at right angles with the selectors to the vertical sides 141 and 142 of box 6.

These bars 140 consist of U-shaped members in which are provided perforated portions 143, as shown in Figs. 17 and 23, which form members 144.

There are as many members 144 per bar 140 as selectors and as many selecting bars 140 as groups of contact-spring sets incorporated in a selector (Fig. 1).

To each member 144 is attached, inside the U, a threaded rod on which is screwed the coiled part of a hair spring 145, called a selecting finger. A second spring 146, called a damping spring, is articulated to spring 145 at the part connecting the straight portion to the coiled portion. This second spring 146 incorporates a coiled part through which spring 145 passes.

As shown in Fig. 23, both ends of selecting bar 140 are attached to journals 147 by means of screws 148. These screws 148 pass through holes 149 in bars 140 and work into tapped holes 150 provided in journals 147. These journals 147 consist of shouldered rods the narrow portion of which is inserted freely in recesses 151 provided in sides 141 and 142 of box 6. Holes 149 are elongated so as to permit adjustment of the position of the bar as well as its end play.

Each selecting bar 140 is placed under the control of a pair of magnets, such as 152 and 153. The magnets are installed in groups of two removable and interchangeable assemblies attached to the sides 141 and 142, respectively, of box 6. The first, third, fifth, etc., bars 140 (Fig. 17) are operated by the first, second, third, etc., pairs of right-hand magnets, respectively, and the second, fourth, sixth, etc., bars 140 are operated by the first, second, third, etc., pairs of left-hand magnets, respectively.

Each magnet 152 (Figs. 18, 19, and 21) comprises a core 154 which, with cheeks 155 and 156, forms a reel on which are placed the winding or windings. Cheek 156 is square and to it are attached connecting terminals 160. The reel is attached to a bent member 157 of a yoke 158 by means of a screw 159 working into core 154.

Yoke 158 is common to all the selectors of the same group of selector magnets and consists of a soft-iron plate incorporating cut-out and bent members 157 and cut-out members 161. In addition, yoke 158 has a recess 162 for the end of the attaching screws 163 of the contact-spring stacks 164 associated with each selecting magnet 152 or 153.

A straight slot 165 and a circular recess 166 (Fig. 20) are provided at the center of members 161 of yoke 158.

On each of the members 161 is mounted a pin 167 (Fig. 20) having a flange 168 installed in recess 166 and extended by a straight member 169 installed in slot 165, this member 169 preventing the rotation of pin 167. This pin is attached by a nut 170 installed on the threaded end and locked against member 161 by means of a metal washer 171.

A movable blade 172 common to the pair of magnets 152 and 153 of a group of selecting magnets is pivotally mounted on pin 167. Blade 172 is made of soft iron, having a profile as shown in Fig. 18 or 24, and incorporates two bent members 173 and 174 through which pin 167 passes; it is held in position on pin 167 by a locking arrangement 175 consisting of a split tube slipped tightly over pin 167. In order to enable blade 172 to move freely on its pin, flange 168 has been made slightly thicker than the depth of its recess 166, thus preventing member 173 of blade 172 from rubbing against member 161 of the yoke. In addition to this, a certain amount of play has been provided between locking arrangement 175 and member 173 of blade 172.

The two portions 176 and 177 of blade 172, arranged on either side of bent members 173 and 174, are each placed opposite the attracting pole of selecting magnets 152 and 153 and form two oblique planes with respect to the plane of the central portion of blade 172, as shown in Fig. 19, or even better, as shown in perspective in Fig. 24. Each of parts 176 and 177 incorporates at its outer portion a member 178 which controls a lever 179 (Fig. 21).

The two levers 179 of a pair of magnets 152 and 153 are symmetrical; they are cut out and bent as shown in Fig. 22. Each lever 179 has a central portion 180, bent at an obtuse angle and having two extension arms 181 and 182. Lever 179 bears against the inner edge of the dihedron on the edge of yoke 158; it is held in this position by one of the T-shaped ends 183 of a spring 184, the vertical part of the T being inserted in a recess 185 provided in portion 180.

Spring 184 is common to the two levers 179 of a magnet pair and for this purpose has two symmetrical ends; it is secured by two screws 186 working into two tapped holes 187 provided in yoke 158.

The slightly bent end of lever 181 is installed under member 178 of blade 172. Lever 182, the end of which is also slightly bent, incorporates a member 188 installed under the movable guide bar 189 of a contact-spring stack 164.

Stacks 164 are built up in the manner described in the copending patent application filed by Daniel Dautry, on December 13, 1951 and bearing Serial No. 261,538.

The two stacks 164 of a selecting magnet pair form a removable assembly secured by two screws 163 to yoke 158.

A spring 190 associated with stack 164 bears on the end of arm 182 of lever 179. Its purpose is to bring blade 172 back into the home position when the corresponding magnet is not energized.

Yoke 158, on which are mounted the pairs of selecting magnets, is attached by two screws 191 and 191' to two squares 192 and 192' welded to the sides of a box 193 and by screws, such as 194, which pass through side 195 of box 193 and work into members 157 of yoke 158 (Figs. 19 and 21).

The terminals 160 of magnets 152 and 153 and the terminals 196 of the contact springs of stacks 164 pass through rectangular openings, not shown, in the side 195 of box 193. Insulating plates 197, which also provided with rectangular openings—but only of such size as to permit passage of the terminals—are inserted between the inside face of side 195 and the stacks 164, so as to cover the unused parts of the openings provided in side 195.

It will be observed that because of the U-shaped arrangement of locking plates 198 of stacks 164, it is possible to close off completely the openings provided in plates 197, when stacks 164 have a smaller number of contact springs. If necessary, the branches of the U can be made higher.

Side 199 of box 193 (front view of Fig. 19) is narrow in order to permit access either to stacks 164 or to selecting magnets 152 and 153 for replacement purposes, for example. For the same reason, openings 200 are provided in side 198 to permit access to attaching screws 163 of stacks 164.

A box of selecting magnets 193 is mounted in the position shown in the front view of Fig. 18 or in the side view of Fig. 19, against the side 141 of box 6. Another box, identical with 193, is installed back-to-back with respect to the other box against side 142 of box 6. For this purpose, openings 201 and 202 are provided (Fig. 19) to permit passage of attaching screws 203 (Fig. 26) and 204 (Fig. 17).

Each selecting bar 140 is rigidly attached to movable blade 172 of the magnet pair consisting of magnets 152 and 153 and corresponding to said bar 140 by a driving device mounted on that part of journal 147 which is outside of side 141 or 142 of box 6, as shown in Figs. 17 and 24.

Fig. 24 shows the driving device of a bar 140 having its pair of selecting magnets on its left.

The driving device is made up essentially of two symmetrical parts 205 and 206 cut to shape and bent to form ends 205A and 206A, respectively as shown and held together at their rounded parts 207 on journal 147 by two screws 208 placed on either side of said journal and locked by two nuts 209. Parts 205 and 206 have an offset bend at 210 in order that their two bent ends can clamp part 137 of blade 172.

Fig. 25 shows a device for connecting together two selecting bars when it is desired to associate several multi-selectors giving access to the same outgoing lines.

The selecting bars of a group of multi-selectors built up in this way are driven by the same number of pairs of selecting magnets as that used for a single multi-selector. The two boxes of magnets 193 are mounted on the ends of the multi-selector assembly; the selecting bars on the adjacent sides of the multi-selectors are associated with each other through two driving devices similar to that used for driving a selecting bar by the movable blade of a pair of magnets. The two ends of parts 205 and 206 of a device, mounted on a journal 147 of a selecting bar, are held by the two ends of parts 205 and 206 of the device mounted on journal 147 of the other corresponding bar.

It will be noted that this coupling device makes possible to adjust for any slight shift that may be necessary between the centerlines of the two journals 147.

Fig. 26 shows a side view of a multi-selector with its front cover 211 and rear cover 212, provided with supporting devices, not shown. Covers 211 and 212 close off box 6.

Cover 214 is slid from front to back with respect to the multi-selector, on selecting-magnet box 193, the top and bottom of said cover having their edges bent down so as to engage in recess 215 (Fig. 17) formed by the fold 216 in box 193.

The sides of box 6 have openings 217 opposite terminals 100 of the selector contact springs 87 and 88. These openings 217 are covered by insulating plates 218 each attached by means of two screws 219 to members 220 provided on the sides of said openings 217.

Tubular terminals 221 are riveted to plates 218. The multipling wires of the contact springs of the multi-selector selectors are connected to the inside of said tubular terminals and the outgoing wires are connected to their outside.

Various wires such as the points common to the stacks 89 of the various selectors may be connected to the terminals of upper plate 218.

All the plates 218 are similar to the lower plate, shown in full, with its terminals 221. The second plate has been removed in order to show the opening 217 and the connecting terminals 100 of the spring stack.

On the top and back of the multi-selector are also mounted insulating plates 222, also comprising a certain number of terminals 221 to which are connected the wires associated with each of the selectors (incoming lines, circuits of the operating bar magnets of the selectors and circuits connected to the terminals of stacks 69).

The multi-selector is attached to the chassis by means of two angle irons 223 secured to the top and bottom of box 6.

In this way there is obtained a completely enclosed assembly which is dust proof and whose interior can be made visible by means of glass windows or transparent portions provided in the covers.

The operation of the multi-selector will now be described with reference to Figs. 1, 2, 3, 9, 14 and 17.

It will be assumed by way of example that an incoming line L1 (Figs. 1 and 17), connected to the ten bars of bank 129 of selector S1 (left-hand side of Fig. 17), is to be connected to an outgoing line L2 (Figs. 1 and 17), connected to the ten terminals 100 of the upper set of movable contact springs of selector S1.

First of all, magnet 152 of the upper right-hand pair of selecting magnets (Fig. 17) is energized. Part 176 of blade 172 is attracted to the core of magnet 152, said blade 172 rotating on its pin 167 and driving selecting bar 140, which turns on its journals 147. The selecting fingers 145 of said bar are driven upward and come under guide bars 115 (Figs. 1 and 14) of the upper sets of the contact-spring groups under the control of said bar.

At the same time, part 176 of blade 172, acting through its member 178 on the arm 181 of lever 179, causes the latter to rotate and it, in turn, through its arm 182 acts on the movable guide bar 189 of stack 164 of magnet 152.

Next, the magnet 52 associated with the operating bar 11 of selector S1 is energized. Blade 57 of said magnet is attracted to the core of the magnet and rotates on its pin 58, and drives lever 61. By means of its part 63 (Fig. 2), lever 61 drives lever 16 and causes bar 11 to rotate. Driving part 34 associated with bar 11 drives the selecting fingers 145 of all the selecting bars 140 of the multi-selector. Only finger 145 of the bar selected drives guide bar 115 through the latter's shoulder 119 and the contact springs 87 and 88 come in contact at 90 with the bars of the two rows 122 and 121, respectively, of bank 120.

The other selecting fingers 145 of bars 140 of the multi-selector, driven by the operating bar of selector S1, have no effect and move between the guide bars 115 of the groups of contact-spring sets of said selector.

At the same time, button 24 of lever 23 (Fig. 3) displaces by means of part 78 of plate 75 guide bar 74 of stack 69 of the selecting-bar magnet.

Incoming line L1 is thus connected to outgoing line L2. The selecting bar 140 which was moved can return to its home position and be used for other selecting operation. When magnet 152 is de-energized, restoring spring 184 of guide bar 164 and spring 190 restore blade 172 to the home position. Blade 172 restores bar 140 by means of the driving device, selecting finger 145, driven by bar 11 of selector S1, remaining wedged between driving part 34 and shoulder 119 of bar 115 (Fig. 14).

The magnet 52 of the operating bar is held attracted as long as the construction lasts. When said magnet is de-energized, its blade is no longer attracted to the core and spring 111, expanding, returns guide bar 115 against part 83. Operating bar 11 is restored to the home position by part 78 of spring 75 which acts on knob 24 of lever 23.

Magnet 153 is energized in order to select an outgoing line connected to the contact springs of a lower set of a group of contact-spring sets. The corresponding selecting bar rotates in the opposite direction, driving the selecting fingers then downward.

The multi-selector that has just been described is intended for lines L1 or L2 made up of not more than 2 wires. A multi-selector could be made for lines having any number of wires per line. Without changing the described arrangements, lines with less than ten wires, e. g., five, could also be used. In this case, two outgoing lines are connected to the contact springs of the same spring set. The two-line group is then selected in the manner already described, the choice of one of the lines being made by either of the positions taken by the supplementary selecting bar, in accordance with the well-known method.

It would also be possible to connect more than two lines to the springs of one and the same set of connecting springs and select the desired line by using one or more selecting bars of the multi-selector.

These arrangements make it possible to increase the capacity of the multi-selector without increasing the number of members.

Variants of the operating bar 11 are shown in Figs. 27 to 30.

In Figs. 27 and 28, the bars are made of a metal strip bent as shown and welded at 225. The driving parts 34 are attached to parts 226 and the articulated parts 227 are made by cutting and bending each end of the bar.

In Fig. 29, the bar is made of two parts 228 and 229, welded to each other at 230 and 231. The driving parts 34 are mounted on portion 232 of part 229 and the articulated parts 227, made in the same manner as those for the bars of Figs. 27 and 28.

In Fig. 30, the bar is made of a metal strip 233, bent into the shape of a U, the two ends of which are cut and bent so as to form the parts which, in the described example, were attached to the ends of bar 11.

Parts 234, comprising a threaded rod 235, on which are mounted and attached driving parts 34, are installed at intervals.

What is claimed is:

1. In a selector switch of the cross-bar type, a mounting plate, a plurality of selecting fingers extending in a first plane parallel to the plane of said plate, means for selectively actuating said fingers in two directions parallel to said first plane, a shiftable control bar common to and in coordinate relation with said fingers, said bar extending in the same plane as said plate and movably mounted from a first edge of said plate, means for actuating said bar in a direction perpendicular to said first plane, a removable bank of fixed contacts mounted adjacent said first plate edge, said bank comprising a plurality of rows of fixed contacts, each row lying in a second plane perpendicular to said first plane and having terminals adapted to be connected to a line, the contacts in each row staggered in relation to the contacts of an adjacent row, a plurality of rows of movable contact sets mounted in superposed groups on said plate adjacent an edge thereof opposite said first edge, adjacent of the contacts of each group having a different length and alternate of the contacts of each group having the same length, each contact group having terminals adapted to be connected to a series of other lines, separate means coupled to each contact group for actuating the contacts of said group, said fingers adapted to selectively cooperate with said contact actuating means under control of said bar to cause selected of said movable contacts to cooperate with the fixed contacts of said bank.

2. In a selector switch as claimed in claim 1, wherein said bank of fixed contacts comprises a plurality of rows of parallelly spaced bars extending a distance substantially equal to the depth of the rows of said movable contact groups, a plurality of spaced insulated guide strips, having a plurality of apertures therethrough, the apertures of each strip in register with corresponding apertures in each other strip, a different of said fixed contact bars extending through corresponding of said apertures.

3. In a selector switch as claimed in claim 2, wherein said fixed contact bars are of a polygonal cross section and have a coating of a precious metal on the side thereof with which said movable contacts cooperate.

4. In a selector switch as claimed in claim 1, wherein said means for selectively actuating said selecting fingers comprises an auxiliary plate adapted to be mounted in the same plane as said mounting plate, a plurality of separate electromagnetic motor means mounted on said auxiliary plate in rows parallel to the direction of said rows of movable contact groups, a rotatable selecting bar adapted to cooperate with each of said motor means, and removable coupling means attached to said bar, said coupling means adapted to couple said bar to said motor means.

5. A selector switch according to claim 1, further comprising a pair of retaining elements having first ends detachably secured to spaced portions of said plate intermediate said edges and having other ends extending over said first plate edge, said control bar having angularly shaped ends adapted to pivot over said first plate edge, each of said retaining elements having portions in locking contact with said bar ends for retaining said bar in contact with portions of said first plate edge, said control bar detachable from said first plate edge upon detachment of said retaining elements from said plate.

6. A selector switch according to claim 1, in which said control bar is mounted in spaced parallelism to one edge of said plate and the contacts of each of said contact sets extend beyond the said edge of said plate into the space between said control bar and said plate edge.

7. A selector switch according to claim 1, in which said movable contact sets extend normal to the length of said control bar, each set including a plurality of groups of contact springs with the groups spaced apart along the direction of said fixed contact bars and each group arranged to be selectively moved into contact with said fixed contact bars, and a swingable selector bar is mounted so as to extend normal to said plate, said selector bar carrying a plurality of deflectable selector rods which are respectively selectively positionable between the control bars of adjacent mounting plates of like switches which may be disposed in spaced rows, whereby said selector bar may simultaneously position its associated selector rods in a plurality of said similar switches.

8. A selector switch according to claim 1, in which said movable contact sets are arranged in superposed stacks on said plate and with the contact springs of each set forming a pile-up with the thickness of the pile-up extending normal to said plate.

9. A selector switch according to claim 1, in which said bank of fixed contacts comprises a plurality of contact bars in the form of parallel rods mounted in spaced offset planar relation, and the contacts of each of said groups of movable contacts are mounted at right angles to said bars, each of said sets of movable contacts including at least two contact springs of different lengths and correlated with the offsetting of said contact bars.

10. A selector switch according to claim 4, in which said coupling means comprises a pair of substantially arcuate-shaped fingers, each having a bifurcated end and an end attached to the adjacent ends of each of said selector shafts, the bifurcated ends of said fingers engaging each other in overlapping relation.

11. A selector switch according to claim 4, in which said coupling means comprises a pair of spaced fingers attached to the adjacent ends of each of said selector shafts, each finger having a portion extending outwardly from the shafts and a portion extending in the direction of the shafts, the last-mentioned portions being interleaved to accommodate different spacings between the shaft ends and to accommodate angular offset between the shaft ends.

References Cited in the file of this patent

UNITED STATES PATENTS

| Number | Name | Date |
|---|---|---|
| 1,528,761 | Goff | Mar. 10, 1925 |
| 2,235,861 | Wood | Mar. 25, 1941 |
| 2,447,010 | Harrison | Aug. 17, 1947 |
| 2,577,067 | Arthur | Dec. 4, 1951 |